12/30/86 XR 4,633,428

United States Patent [19]

Byron

[11] Patent Number: 4,633,428

[45] Date of Patent: Dec. 30, 1986

[54] OPTICAL MATRIX-VECTOR MULTIPLICATION

[75] Inventor: Kevin C. Byron, Bishop's Stortford, England

[73] Assignee: Standard Telephones and Cables Public Limited Company, London, England

[21] Appl. No.: 694,247

[22] Filed: Jan. 24, 1985

[30] Foreign Application Priority Data

Feb. 25, 1984 [GB] United Kingdom ................. 8404966

[51] Int. Cl.[4] ......................... G06G 7/16; G02B 6/10; G02B 5/18

[52] U.S. Cl. ................................... 364/841; 364/845; 350/96.14; 350/162.11

[58] Field of Search ............... 364/841, 800, 801, 807, 364/844, 845, 829; 350/96.11, 96.14, 162.11, 162.12, 400, 401, 402, 403, 404, 405, 406

[56] References Cited

U.S. PATENT DOCUMENTS 4,567,569 1/1986 Caulfield ............................ 364/841

*Primary Examiner*—E. A. Goldberg

*Assistant Examiner*—Mark Reinhart

*Attorney, Agent, or Firm*—Kerkam, Stowell, Kondracki & Clarke

[57] ABSTRACT

An optical matrix-vector multiplier for multiplying an m-row n-column matrix by an n-component vector to form an m-component vector (FIG. 1). In the specific case of a 3×3 matrix (FIGS. 4*a* and 4*b*), the multiplier comprises three light-emitting devices (21,22,23), for example LEDs, each emitting at a different wavelength ($\lambda_1$, $\lambda_2$, $\lambda_3$), an acousto-optic modulator (29) driven by each x value in turn, and three integrating photodetectors (32, 33, 34) each receptive to a respective one of the different wavelengths. A single collimating lens (30) serves to apply light, emitted by each of the LEDs in turn in response to respective matrix components, to the modulator (29). The LEDs may be connected by respective optical fibers (24, 25, 26) to a fiber coupler (28) and thence via a common optical fiber (27) to the lens (30), or coupled by a dispersive element (35—FIG. 5) to the lens (30). Use of a single collimating lens facilitates integration of the multiplier elements into an integrated optic device.

9 Claims, 9 Drawing Figures

$$\begin{bmatrix} y_1 \\ y_2 \\ \cdot \\ \cdot \\ y_m \end{bmatrix} = \begin{bmatrix} a_{11} & a_{12} & \cdot & \cdot & a_{1n} \\ a_{21} & a_{22} & \cdot & \cdot & a_{2n} \\ \cdot & \cdot & \cdot & \cdot & \cdot \\ \cdot & \cdot & \cdot & \cdot & \cdot \\ a_{m1} & a_{m2} & \cdot & \cdot & a_{mn} \end{bmatrix} \begin{bmatrix} x_1 \\ x_2 \\ \cdot \\ \cdot \\ x_n \end{bmatrix}$$
Fig. 1.
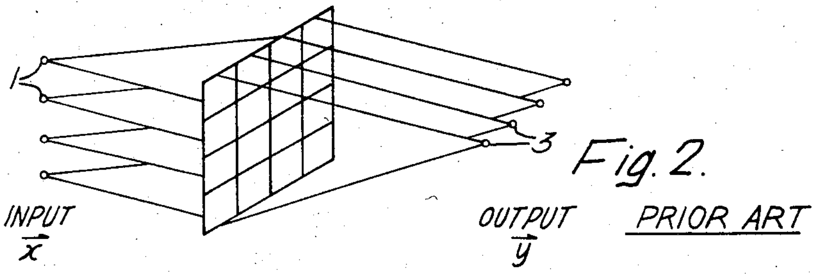
Fig. 2. PRIOR ART
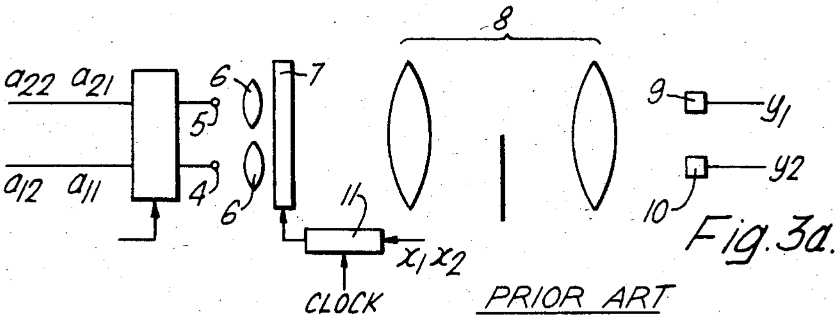
Fig. 3a.
PRIOR ART
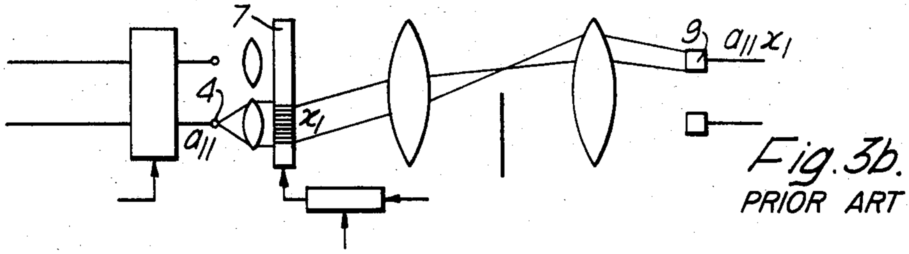
Fig. 3b.
PRIOR ART
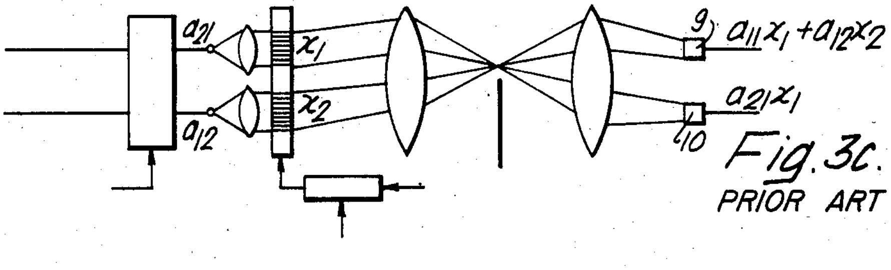
Fig. 3c.
PRIOR ART

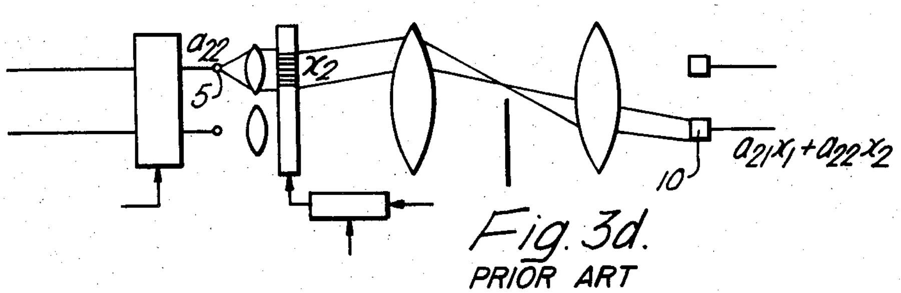
Fig. 3d.
PRIOR ART
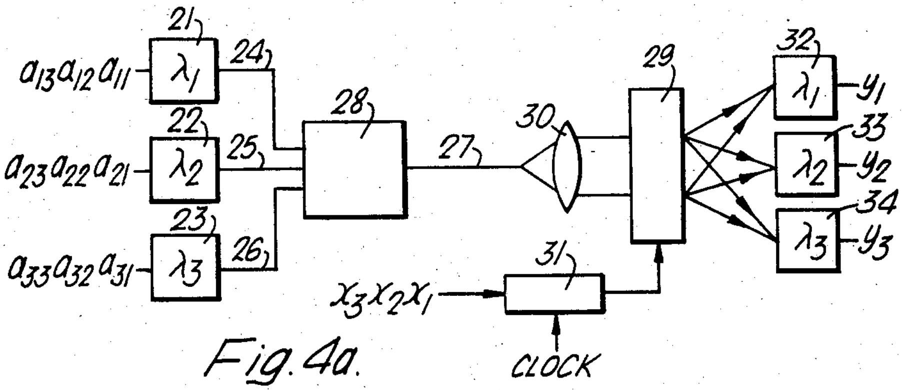
Fig. 4a.
$$\begin{bmatrix} y_1 \\ y_2 \\ y_3 \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} x_1 \\ x_2 \\ x_3 \end{bmatrix}$$
Fig. 4b.
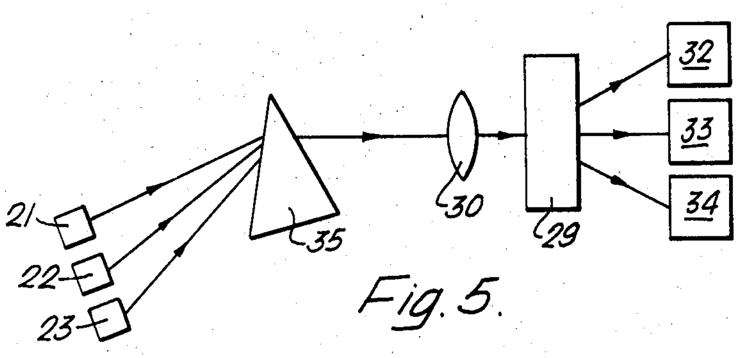
Fig. 5.

OPTICAL MATRIX-VECTOR MULTIPLICATION

BACKGROUND OF THE INVENTION

This invention relates to optical computation and in particular to an optical matrix-vector multiplier.

SUMMARY OF THE INVENTION

According to one aspect of the present invention there is provided an optical matrix-vector multiplier, for multiplying a matrix comprising m rows and n columns of components by a vector with n components whereby to form an m-component vector, comprising m light-emitting devices each capable of producing light at a different respective wavelength, a collimating lens, an acousto-optic modulator capable of being driven in response to each of the n components of the vector, and m integrating photodetectors each responding to a different one of said wavelengths, and wherein in use light is produced by each of said light-emitting devices in turn and directed to said acousto-optic modulator, for modulation thereby, by the collimating lens, which lens is common to all of the light-emitting devices, the photodetectors being disposed to detect the modulated light.

According to a further aspect of the present invention there is provided an optical matrix-vector multiplier, for multiplying a matrix comprising m rows and n columns of components by a vector with n components whereby to form an m-component vector, comprising m light-emitting devices, a collimator, a modulator capable of being driven in response to each of the n components of the vector, and m integrating photodetectors each responding to a different one of said light-emitting devices, and wherein in use light produced by each of said light-emitting devices is directed to said modulator, for modulation thereby, by the collimator which is common to all of the light-emitting devices, the photodetectors being disposed to detect the modulated light.

According to another aspect of the present invention there is provided an optical method of multiplying a matrix comprising m rows and n columns of components by a vector, comprising driving an acousto-optic modulator in response to each of the n components of the n component vector in turn whereby to correspondingly modulate light directed thereto, wherein whilst the first component of the n-component vector is so driving the modulator each of m light-emitting devices, each capable of producing light at a respective different wavelength, is driven in turn in response to a respective one of the components of the first column of the matrix whereby to produce a light signal corresponding thereto for modulation by the acousto-optic modulator, detecting each of said modulated light signals by a respective one of m integrating photodetectors, each responding to a different one of said wavelengths, wherein whilst the second component to the n-component vector is so driving the modulator each of the m light-emitting devices is driven in turn in response to a respective one of the components of the second column of the matrix to produce a light signal corresponding thereto, each of which signals is modulated by the acousto-optic modulator, detected by the respective photodetector and added to the preceding detected light signal, and so on until the nth vector of the n-component vector has been employed to drive the acousto-optic modulator and the nth column of matrix elements has been employed to drive the light emitting devices, the integrated outputs of the photodetectors each comprising one component of the m component vector, and wherein the light signals produced by the light-emitting devices are each directed to the acousto-optic modulator via a single common collimating lens.

BRIEF DESCRIPTION OF THE DRAWINGS

Embodiments of the invention will now be described with reference to the accompanying drawings, in which:

FIG. 1 shows the general matrix-vector product equation $y=Ax$;

FIG. 2 illustrates, schematically, a first known optical matrix-vector multiplier;

FIG. 3*a* illustrates, schematically, a second known optical matrix-vector multiplier, and FIGS. 3*b* to 3*D* show the multiplier at different stages of operation.

FIG. 4*a* illustrates, schematically, an embodiment of matrix-vector multiplier according to the present invention, and FIG. 4*b* indicates the matrix-vector product equation concerned, and FIG. 5 illustrates schematically another embodiment of matrix-vector multiplier according to the present invention.

DESCRIPTION OF THE PREFERRED EMBODIMENTS

Referring firstly to FIGS. 1 and 2, the optical matrix-vector multiplier of FIG. 2, often called the Stanford optical matrix-vector multiplier, performs multiplication of a matrix A by a vector x to obtain a matrix-vector product y ($y=Ax$), y, A and x having components as indicated in FIG. 1. This Stanford multiplier has the capability of multiplying a 100-component vector by a 100 by 100 matrix in roughly 20ns. Components of the input vector x are input via a linear array of LEDs or laser diodes, such as 1. The light from each source is spread out horizontally by cylindrical lenses, optical fibres or planar light guides (not shown) to illuminate a two-dimensional mask (2) that represents the matrix A. Light from the mask 2, which has been reduced in intensity by local variations in the mask transmittance function, is collected column by column (by means not shown) and directed to discrete horizontally arrayed detectors such as 3. The outputs from these detectors represent the components of output vector y. This Stanford multiplier suffers from several disadvantages, in particular accuracy is limited by the accuracy with which the source intensities can be controlled and the output intensities read; the dynamic range is source and/or detector limited; rapid updating of the matrix A requires use of a high-quality two-dimensional read-write transparency (a spatial light modulator) whose optical transmittance pattern can be changed rapidly. Presently such a device with all of the desired characteristics does not exist.

Another known optical matrix-vector multiplier is illustrated in FIG. 3*a*, this being derived from systolic-array processing which is an algorithmic and architectural approach initially employed to overcome limitations of VLSI electronics in implementing high-speed signal-processing applications. Systolic processors are characterised by regular arrays of identical (or nearly identical) processing cells (facilitating design and fabrication), primarily local interconnections between cells (reducing signal-propagation delay times), and regular data flows (eliminating synchronisation problems).

Although the motivating factors are different, systolic-processing algorithmic and architectural concepts are also applicable to optical implementation. This is primarily due to the regular data-flow characteristics of optical devices like acousto-optic cells and CCD detector arrays, and because of the ease of implementing regular interconnect paterns optically.

The example of systolic optical matrix-vector multiplier shown in FIG. 3*a* is set up for the multiplication of a $2\times2$ matrix by a 2-component vector. The processor consists of input LEDs 4 and 5 or a laser diode array, a collimation lens 6 for each LED, an acousto-optic cell 7, a Schlieren imaging system 8 and two integrating detectors 9 ahd 10. The acousto-optic cell 7 has a clocked driver 11 serving to apply the vector components $x_l$, $x_2$ in turn thereto. The matrix components $a_{11}$, $a_{12}$ are applied successively to LED 4 and the matrix components $a_{21}$, $a_{22}$ are applied successively to LED 5, the order of application to the LED array being $a_{11}$, $a_{21}$, $a_{12}$, $a_{22}$. The output voltage of detector 9 is proportional to $a_{11}x_1+a_{12}x_2$, that is the output vector component $y_1$, whereas that of detector 10 is proportional to $a_{21}x_1+a_{22}x_2$, that is the output vector component $y_z$.

The actual operation of the multiplier of FIG. 3*a* comprises the following sequence of events. The first input $x_1$ to cell 7 produces a short diffraction grating, with diffraction efficiency proportional to $x_1$, that moves across the cell. When that grating segment is in front of LED 4 (FIG. 3*b*) the LED 4 is pulsed to produce light energy proportional to matrix element $a_{11}$ and the integrating detector 9 is illuminated with light energy proportional to the product $a_{11}x_1$. When the $x_1$ grating segment is in front of LED5 a second grating segment with diffraction efficiency proportional to $x_2$ has moved in front of LED 4. At that moment LED 4 is pulsed to produce light energy in proportion to a $a_{21}$. The integrated output of detector 9 is then proportional to $a_{11}x_1+a_{12}x_2$, whereas that of detector 10 is proportional to $a_{21}x_1$ (FIG. 3*c*). Finally the $x_2$ grating segment moves in front of LED 5, LED 5 is pulsed to produce light energy in proportion to $a_{22}$, and the integrated output of detector 10 is proportional to $a_{21}x_l+a_{22}x_2$ (FIG. 3*d*).

This systolic optical processor, like the Stanford multiplier, has a dynamic range and accuracy determined by the sources, modulator (acousto-optic cell) and detectors. A realistic processing capability for such a processor would be the multiplication of a 100-component vector by a $100\times100$ matrix in approximately $10\mu s$, which is much slower than the Stanford multiplier. The systolic processor, however, has the advantage over the Stanford multiplier that the matrix can be changed with each operation.

A disadvantage of the systolic optical processor described with reference to FIGS. 3*a* to 3*d* is the requirement of an individual lens element for each LED since this does not facilitate integration of various of the processor components into a single integrated optic device.

The systolic optical processor of FIG. 4*a* requires only a single lens and thus facilitates integration into a single integrated optic device. FIG. 4*a* illustrates a processor for the multiplication of a $3\times3$ matrix by a 3-component vector, as indicated in FIG. 4*b*. The processor comprises three LEDs or laser diodes 21,22,23, operating at different wavelengths $\lambda_1,\lambda_2$, $\lambda_3$ respectively, with their optical outputs applied to respective optical fibres 24, 25, 26 which are coupled to a single optical fibre 27 via a fibre coupler 28. Light output from fibre 27 is coupled to a modulator including an acousto-optic cell 29 via a single collimating lens 30. The acousto-optic cell 29 has a clocked drive means 31. The processor further comprises three integrating detectors 32,33,34, each disposed to receive the light exiting the acousto-optic cell for a corresponding one of the wavelengths $\lambda_1,\lambda_2,\lambda_3$. This means that a complex imaging system such as the Schlieren system of the known FIG. 3 arrangement is not required. By employing optical fibres 24, 25, 26 and the fibre coupler 28, and since only one LED or laser diode is actuated at a time, only a single collimating lens 30 is required. This embodiment of optical processor thus facilitates ihtegration of the elements thereof into a single integrated optic device.

The actual operation of the multiplier of Fig. 4a is as follows. With an input to LED 21 such as to produce light energy, of wavelength $\lambda_1$, proportional to matrix element $a_{11}$, which light energy is supplied to acousto-optic cell 29 via fibre 24, coupler 28, fibre 27 and lens 30, and an input to the acousto-optic cell such as to produce a diffraction grating with diffraction energy proportional to $x_1$, the integrating detector 32 disposed to collect light energy of wavelength $\lambda_1$ is illuminated with light energy proportional to $a_{11}x_l$. Thus the output of integrating detector 32 is proportional to $a_{11}x_1$. An input is next applied to LED 22 to produce light energy proportional to matrix element $a_{21}$, with the input to the modulator 29 still such as to produce a diffraction grating with diffraction energy proportional to $x_1$. The light output of the modulator is this time of wavelength $\lambda_2$ and thus directed towards integrating detector 33 which then has an output proportional to $a_{21}x_1$. With the same input to modulator 29, an input is then applied to LED 23 and an output at detector 34 proportional to $a_{31}x_1$ obtained. An input to the modulator such as to provide a diffraction grating with diffraction energy proportional to $x_2$ is then supplied, and an input applied to LED 21 such as to produce an integrated output at integrating detector 32 proportional to $a_{11}x_1+a_{12}x_2$. This sequence of operations is continued until the integrated output at detector 32 is proportional to $a_{11}x_1+a_{12}x_2+a_{13}x_3$, which is the value of $y_1$ in the matrix operation indicated in FIG. 4*b*, the integrated output at detector 33 is proportional to $a_{21}x_1+a_{22}x_2+a_{23}x_3$, which is $y_2$, and the integrated output at detector 34.is proportional to $a_{31}x_1+a_{32}x_2+a_{33}x_3$, which is $y_3$.

As will be appreciated from FIGS. 4*a* and 4*b*, the first row of the matrix elements are applied in turn to the first LED 21 of the LED stack, the second row of matrix elements are applied in turn to the second LED 22 and so on. Whilst the invention has been described in terms of multiplication of a $3\times3$ matrix by a three component vector, it is not to be considered as so limited. It is also not necessary for the matrix to be a square matrix, it may have n columns and m rows as indicated in FIG. 1, in which case the y vector has m components whereas the x vector has n components. For such a matrix m LEDs and m detectors will be required.

Multiplication of a matrix by a vector component is achieved by modulating a stack of LEDs or laser diodes, each having different wavelengths, with appropriate ones of the matrix elements and driving the acousto-optic modulator with each x component in turn. The integrated outputs of the detectors for each wavelength give the y components. This enables high speed analogue computation for use in computers and signal processing in situ, for example in remote optical sensing. It is considered that multiplication of a 100×100 element matrix by a 100 component vector would be limited by the speed of the acousto-otpic modulator's operation, which would be of the order of a few nanoseconds. Whereas the means for coupling all of the light emitting devices (LEDs or laser diodes) to the single collimating lens has been described as optical fibres and an optical fibre coupler, it may alternatively be comprised by a dispersive element such as a grating or prism 35, as illustrated schematically in FIG. 5, which employs the same reference numerals for similar elements to those in FIG. 4*a*. One advantage of the use of fibres and a coupler as in FIG. 4*a* is, however, that the "receiver" end of the system, that is from the input to lens 30 onwards, can be remote from the "transmitter" end of the system, that is the light sources 21, 22, 23. It should be noted that the use of semiconductor lasers instead of LEDs would give more wavelength coverage, that is more matrix elements, due to the narrow linewidth.

We claim:

1. An optical matrix-vector multiplier, for multiplying a matrix comprising m rows and n columns of components by a vector with n components whereby to form an m-component vector, comprising m light-emitting devices each capable of producing light at a different respective wavelength, a collimating lens, an acousto-optic modulator capable of being driven in response to each of the n components of the vector, and m integrating photodetectors each responding to a different one of said wavelengths, and wherein in use light is produced by each of said light-emitting devices in turn and directed to said acousto-optic modulator, for modulation thereby, by the collimating lens, which lens is common to all of the light-emitting devices, the photodetectors being disposed to detect the modulated light.

2. An optical matrix-vector multiplier as claimed in claim 1 wherein the light produced by each light-emitting device is transmitted along a respective optical fibre to a respective input of a common optical fibre coupler and wherein the coupler has a single output fibre which serves to transmit light to the lens.

3. An optical matrix-vector multiplier as claimed in claim 1, wherein the light produced by each light-emitting device is coupled to the common collimating lens by a common dispersive element.

4. An optical matrix-vector multiplier as claimed in claim 1, wherein the light-emitting devices are comprised by semiconductor lasers.

5. An optical method of multiplying a matrix comprising m rows and n columns of components by a vector, comprising driving an acousto-optic modulator in response to each of the n components of the n component vector in turn whereby to correspondingly modulate light directed thereto, wherein whilst the first component of the n-component vector is so driving the modulator each of m light-emitting devices, each capable of producing light at a respective different wavelength, is driven in turn in response to a respective one of the components of the first column of the matrix whereby to produce a light signal corresponding thereto for modulation by the acousto-optic modulator, detecting each of said modulated light signals by a respective one of m integrating photodetectors, each responding to a different one of said wavelengths, wherein whilst the second component to the n-component vector is so driving the modulator each of the m light-emitting devices is driven in turn in response to a respective one of the components of the second column of the matrix to produce a light signal corresponding thereto, each of which signals is modulated by the acousto-optic modulator, detected by the respective photodetector and added to the preceding detected light signal, and so on until the nth vector of the n-component vector has been employed to drive the acousto-optic modulator and the nth column of matrix elements has been employed to drive the light emitting devices, the integrated outputs of the photodetectors each comprising one component of the m component vector, and wherein the light signals produced by the light-emitting devices are each directed to the acousto-optic modulator via a single common collimating lens.

6. A method as claimed in claim 5, wherein the light produced by each light-emitting device is transmitted along a respective optical fibre to a respective input of a common optical fibre coupler and wherein the coupler has a single output fibre via which light is transmitted to the lens.

7. A method as claimed in claim 5, wherein the light produced by each light-emitting device is coupled to the common collimating lens by a common despersive element.

8. A method as claimed in claim 5, wherein the light-emitting devices are comprised by semiconductor lasers.

9. An optical matrix-vector multiplier, for multiplying a matrix comprising m rows and n columns of components by a vector with n components whereby to form an m-component vector, comprising m light-emitting devices each capable of producing light at a different respective wavelength, a collimator, a modulator capable of being driven in response to each of the n components of the vector, and m integrating photodetectors each responding to a different one of said wavelengths, and wherein in use light is produced by each of said light-emitting devices in turn and directed to said modulator, for modulation thereby, by the collimator which is common to all of the light-emitting devices, the photodetectors being disposed to detect the modulated light.

* * * * *